United States Patent [19]

Sun

[11] Patent Number: 4,588,933
[45] Date of Patent: May 13, 1986

[54] BRUSHLESS DIRECT CURRENT MOTOR CONTROL SYSTEM WITH PROTECTION CIRCUITRY

[75] Inventor: Koushun Sun, Elgin, Ill.

[73] Assignee: Motorola, Inc., Schaumburg, Ill.

[21] Appl. No.: 650,753

[22] Filed: Sep. 13, 1984

[51] Int. Cl.[4] ............................................. H02P 6/02
[52] U.S. Cl. .................................. 318/254; 318/138; 318/434; 318/439
[58] Field of Search ............... 318/138, 254, 439, 434; 310/68 R; 361/23, 30, 33

[56] References Cited

U.S. PATENT DOCUMENTS

| 3,584,280 | 6/1971 | Inagaki | 318/138 X |
| 3,662,237 | 5/1972 | Favre | 318/138 X |
| 4,262,236 | 4/1981 | Gelenius et al. | |
| 4,262,237 | 4/1981 | Gelenius | |
| 4,403,177 | 9/1983 | Weber et al. | |
| 4,472,666 | 9/1984 | Akeda et al. | 318/138 X |

FOREIGN PATENT DOCUMENTS

| 58-33988 | 2/1983 | Japan | 318/254 |
| 58-33987 | 2/1983 | Japan | 318/254 |
| 58-99290 | 6/1983 | Japan | 318/138 |

Primary Examiner—Bernard Roskoski
Assistant Examiner—Bentsu Ro
Attorney, Agent, or Firm—Phillip H. Melamed

[57] ABSTRACT

A brushless direct current motor control system is disclosed in which a permanent magnet rotor induces voltages in phase windings and wherein these voltages are compared to a reference signal to provide for the proper cyclic and sequential energization of the motor drive phase windings. A protection circuit is utilized to couple a reference level, corresponding to the level about which the phase induced signals vary, as an input to the motor control circuit for effective comparison with the phase induced signals so as to provide for the proper sequencing of phase excitation. The protection circuit typically provides a substantially constant voltage drop between the reference level of the induced voltages and the input terminal of the motor control circuit with the protection circuit also preventing any excessively large magnitude voltages from being applied as an input to the motor control circuit. The input signal to the motor control circuit provided by the protection circuit also provides operative power to the motor control circuit.

20 Claims, 1 Drawing Figure

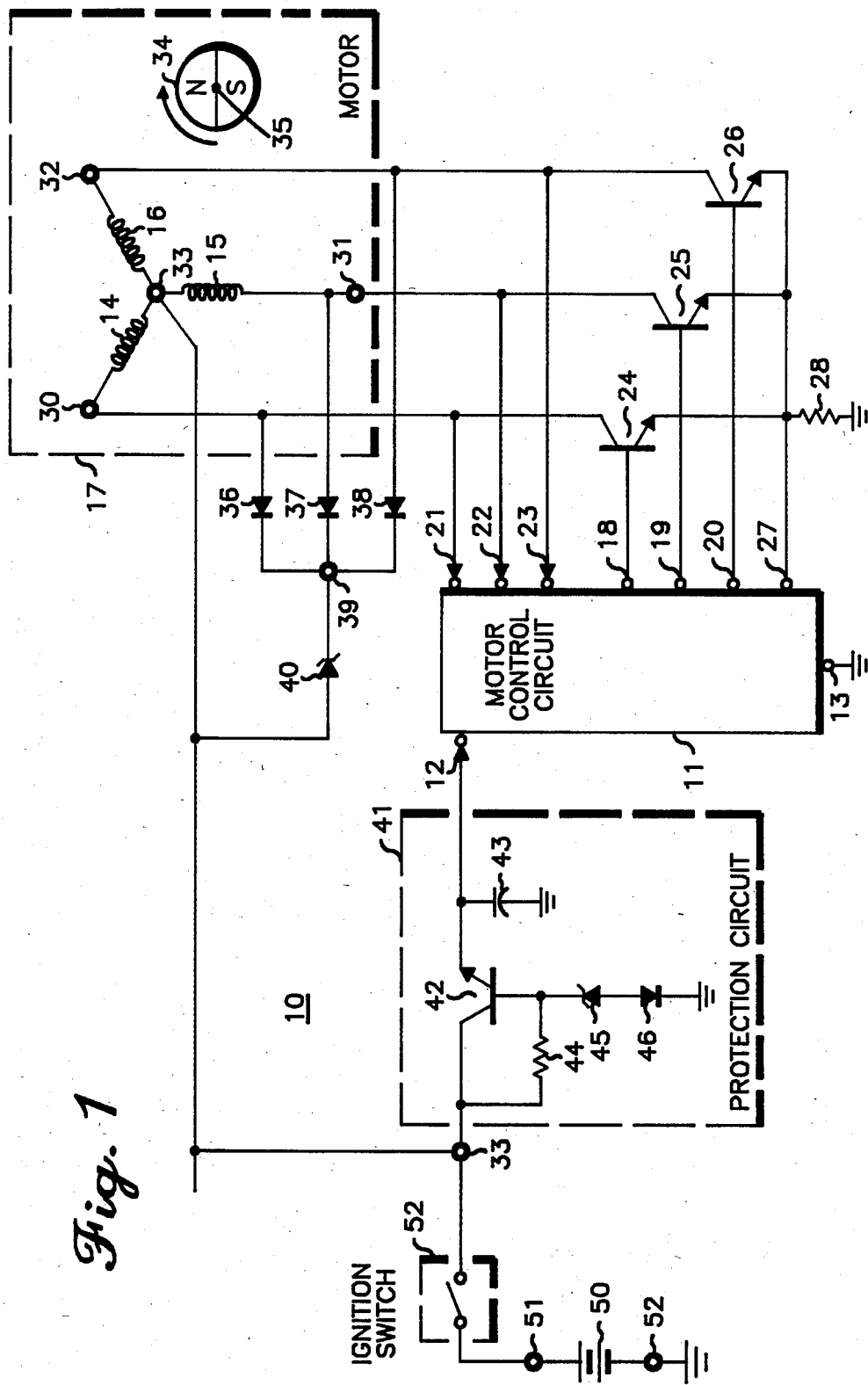

BRUSHLESS DIRECT CURRENT MOTOR CONTROL SYSTEM WITH PROTECTION CIRCUITRY

BACKGROUND OF THE INVENTION

The present invention is related to the field of brushless direct current motor control systems, and more particularly to such systems which include protection circuitry that prevents the destruction of control system components by the occurrence of larger than expected signals which are coupled to the control system components.

Many types of brushless direct current motor control systems are known, and they may be used in automotive applications for controlling fuel pump and fan motors. One known control system is illustrated in U.S. Pat. No. 4,403,177 to Weber et al which is assigned to the same assignee as the present invention. In this prior motor control system, in response to a switch closure low frequency oscillator and sequencing circuits are activated which provide cyclic and sequential phase drive signals to three phase windings of a direct current motor. The sequential actuation of the phase windings results in the rotation of a permanent magnet rotor which in turn results in inducing voltage signals in the two of the three phase windings which are not currently being excited. The phase windings are typically configured in a Y configuration with the induced signals varying about a reference level maintained at the neutral (common) point of the Y configuration. The magnitude of the induced voltages is monitored by a motor control circuit such that when these induced signals exceed a predetermined magnitude related to the voltage potential at the neutral terminal, sequencing of the phase winding drive signals occurs in accordance with the induced signals. Thus, while initially a low frequency oscillator provides for initial sequencing of the phase winding drive signals, subsequently the induced voltage signals in the phase windings are utilized to determine the sequencing of phase winding excitation and thereby determine the rotation of the motor. In this manner the brushless direct current motor is properly driven and controlled without utilization of Hall effect or various other motor position rotation sensors. Similar direct current motor control systems are described in detail in U.S. Pat. Nos. 4,262,236 and 4,262,237.

For proper operation of motor control systems such as those discussed above, it is necessary for the motor control circuit to perform an accurate comparison of the phase induced voltages provided in response to the rotation of the permanent magnet rotor with respect to the nominal voltage level potential about which these phase induced voltages vary. This nominal voltage level exists at the neutral point of the Y configuration of the phase windings and this neutral point is typically directly connected to a direct current battery reference potential. When the nominal voltage of the battery may vary, such as is the case in automotive applications, it is necessary that the motor control circuit receive, as an input signal for comparison with the phase induced voltages, an input reference signal which substantially tracks the reference signal level at the neutral phase winding terminal. This is necessary because unless the motor control circuit receives the proper input reference signal the small signals that are induced in the phase windings during starting will not be properly detected, resulting in continuous operation in the starting mode.

In systems such as that described above, it is possible to directly connect the neutral terminal of the Y configuration as a sense input to the motor control circuit. However, in that case no protection is provided for the motor control circuit in the event of high voltage transient signals occuring at the neutral terminal, and also no protection is provided in the event that a substantially greater than nominal DC voltage is provided at the battery terminal which is connected to the phase winding neutral terminal.

In order to guard against both of these eventualities, a prior protection circuit has been proposed comprising a series resistor coupled between the neutral terminal and the input terminal of the motor control circuit and including a zener diode coupled between ground potential and the input terminal of the motor control circuit. This prior protection circuit has proved to be unsatisfactory because typically the input terminal of the motor control circuit also provides all of the DC operating current to the motor control circuit such that a relatively low impedance to ground is provided at this input terminal. This results in the series resistor providing a variable potential drop between the common terminal and the input terminal of the motor control circuit wherein this potential drop varies in accordance with the amount of current drain provided by the motor control circuit and the magnitude of the battery voltage coupled to the neutral terminal. Thus the input signal to the motor control circuit did not just vary as a function of the magnitude of the signal level at the neutral terminal, but also was determined by the input impedance of the motor control circuit which typically would vary between different motor control circuits. This was unsatisfactory since it would require the individual adjustment of each motor control circuit to provide the proper comparison threshold for the control circuit comparison of the phase induced signals with respect to the voltage at the neutral terminal of the Y configuration. If the control circuit DC operative power terminal was separate from the sense input terminal, then an additional overvoltage circuit might be needed for the operative power terminal thus increasing the system cost, also, if the control circuit was an integrated circuit, an additional input lead for the integrated circuit would be required. In order to overcome all these disadvantages the present invention has been developed.

SUMMARY OF THE INVENTION

An object of the present invention is to provide a brushless direct current motor control system with protection circuitry which overcomes the above mentioned deficiencies of prior systems.

In one embodiment of the present invention a brushless direct current motor control system with protection circuitry is provided. The control system comprises: motor control means for receiving an input reference signal at an input terminal and also receiving a plurality of phase winding signals induced in associated motor phase windings by a varying magnetic field and for providing, in response to the effective comparison of said reference signal with said phase induced winding signals, cyclic and sequential phase winding motor drive signals as outputs to said associated motor phase windings, said induced phase winding signals varying about a predetermined reference signal level provided at a first terminal connected to said motor phase windings; and protection circuit means coupled between said first terminal and said input terminal of said motor control means for receiving said predetermined reference signal level and providing in response thereto said input reference signal, said protection circuit means comprising a transistor having first and second current conducting electrodes coupled between said first terminal and said input terminal of said motor control means and a resistor coupled between one of said first and second electrodes and a control electrode of said transistor.

More specifically, a preferred embodiment of the invention envisions the collector electrode of a transistor being connected to the first terminal which corresponds to the neutral (common) terminal of a Y type configuration for the motor phase windings. The emitter electrode of the transistor is connected to the input terminal of the motor control circuit means and a resistor is connected between the collector and base electrodes of the transistor. The magnitude of the resistor is selected such that, for normal or less than normal voltages provided at the common terminal of the Y configuration of the phase windings, the transistor will provide a substantially constant voltage drop between the first terminal and the input terminal of the motor control circuit. Preferably a zener diode is coupled between the base terminal of the transistor and a reference potential such that for voltages at the first terminal which exceed the normal voltage at the neutral terminal and exceed the reverse breakdown voltage of the zener diode, the transistor will provide a regulated output voltage as an input to the motor control circuit and thereby prevent any overvoltage from being applied to the input terminal of the motor control circuit. This will therefore prevent destruction of the motor control circuit by preventing the application of substantially large voltages at the input terminal of the motor control circuit. Preferably the input terminal of the motor control circuit is also a terminal which provides operative power to the motor control circuit. Thus the present invention also regulates operative power applied to the motor control circuit for battery overvoltages and prevents destruction of the motor control circuit by such overvoltages. These and other features and advantages of the present invention can be more fully understood by reference to the detailed description of the preferred embodiments of the present invention which follows.

BRIEF DESCRIPTION OF THE DRAWING

For a more complete understanding of the present invention reference should be made to the sole drawing FIG. 1 which is a combination block and schematic diagram of a brushless direct current motor control system including protection circuitry.

DESCRIPTION OF THE PREFERRED EMBODIMENTS OF THE INVENTION

Referring to the drawing, a brushless direct current motor control system 10 is illustrated. The motor control system includes a motor control circuit 11 which has an input terminal 12 and a ground reference potential 13. Operative power to the motor control circuit 11 is provided by the voltage potential between the terminals 12 and 13 which is provided by a sense input reference signal received at the terminal 12. The input reference signal at the terminal 12, in addition to providing operative power to the motor control circuit 11, is also utilized by comparison circuitry internal to the motor control circuit for effective comparison with electrical signals induced in phase windings 14, 15 and 16 of a motor 17 shown dashed in the drawing. In response to this effective comparison the motor control circuit 11 provides cyclic and sequential phase winding excitation signals at output terminals 18, 19 and 20, while receiving the induced signals from the phase windings at input terminals 21, 22 and 23. The excitation signals at the output terminals 18 through 20 are coupled to the bases of NPN drive transistors 24 through 26, respectively, which have their emitters coupled together at a current sensing input terminal 27 of the motor control circuit and coupled to ground through a common current sensing resistor 28. The collectors of each of the transistors 24 through 26 are connected, respectively, to end terminals 30 through 32 of the phase windings 14 through 16 which are configured in a Y configuration having a neutral (common) terminal 33. The motor 17 includes a permanent magnet rotor 34 which is rotated about an axis 35 in response to the sequential energization of the phase windings and provides induced voltage signals in the phase windings which are not currently excited due to the varying rotated magnetic field provided by rotation of the permanent magnet 34.

The basic operation of the motor control circuit 11 and the brushless direct current motor 17 is discussed in detail in U.S. Pat. No. 4,403,177, as well as in U.S. Pat. Nos. 4,262,236 and 4,262,237. Thus substantial details concerning the operation of the motor control circuit 11 and motor 17 are not believed to be necessary. Essentially, in response to the initial application of a signal at the terminal 12 which provides operative power to the motor control circuit 11, a low frequency oscillator within the motor control circuit provides for the initial cyclic and sequential energization of the phase windings 14 through 16. This results in the initial slow rotation of the permanent magnet rotor 34. The rotation of the rotor results in inducing signals in the phase windings which are not currently being excited by the drive transistors 24 through 26. The motor control circuit 11 monitors these induced phase signals and effectively compares them with the reference signal applied at the input terminal 12 since the signal at the terminal 12 is contemplated as being related to the reference level being maintained at the neutral terminal 33 of the Y connection. When the induced voltages in the phase windings exceed the reference signal at the terminal 12 by some predetermined amount, this will result in effectively synchronizing and speeding up the sequencing of the phase drive excitation which in turn results in more rapidly rotating the permanent magnet rotor 34 until a final rotational speed for the motor 17 is achieved. This is all explained in detail in the U.S. patents previously referred to. The function of the current drive monitoring resistor 28 is to insure that excessive drive to any of the phase windings is not provided by the motor control circuit, and this is accomplished by monitoring the current applied to the phase windings, and controlling the magnitude of the excitation in response thereto.

The essence of the present invention resides in having the signal at the input terminal 12 of the motor control circuit properly track the reference level provided at the neutral terminal 33 of the phase windings of the motor, and to accomplish this while protecting the motor control circuit 11 from any excessive voltages which may occur at the terminal 33.

Since the phase windings 14 through 16 essentially comprise inductors, it is known that upon termination of excitation to any of these phase windings a substantial reverse inductive voltage spike may occur. To dampen the effect of this voltage spike a plurality of diodes 36 through 38 are connected with their anodes directly connected to the terminals 30 through 32, respectively, and their cathodes connected to a common terminal 39. The terminal 39 is connected to the cathode of an 18 volt zener diode 40 which has its anode directly connected to the terminal 33. This configuration results in the diodes 36 through 38 and 40 effectively forming flyback diodes which will limit the reverse voltage spikes provided by the phase windings to 18.7 volts. This assists in minimizing the amount of voltage variations which may occur at the terminal 12. However, a main feature of the present invention resides in the providing of a protection circuit 41 (shown dashed in the drawing) which is coupled between the neutral terminal 33 and the input terminal 12 of the motor control circuit 11. The protection circuit 41 receives the predetermined signal level at the terminal 33 and provides, in response thereto, the input reference signal at the terminal 12 which is then compared by the circuit 11 with the induced phase winding voltages provided at the terminals 21 through 23.

The protection circuit 41 includes an NPN transistor 42 which has its emitter electrode directly connected to the terminal 12 and connected to ground through a transient suppressing capacitor 43. The collector electrode of the transistor 42 is directly connected to the terminal 33 (shown twice in the drawing for ease of understanding) as well as being connected through a selected resistor 44 to its base (control) electrode. The base electrode of the transistor 42 is directly connected to the cathode of an 18 volt zener diode 45 which has its anode connected to the anode of a diode 46 that has its cathode connected to ground. The components 42 through 46 essentially comprise the protection circuit 41.

In order to best understand the operation of the protection circuit 41, it should be noted that the motor control system 10 includes a battery 50 which provides a nominal 14 volt voltage potential between battery terminals 51 and 52 with terminal 52 corresponding to the negative terminal of the battery and being connected to ground potential and terminal 51 corresponding to the positive terminal of the battery. The battery 50 is contemplated as corresponding to an automobile storage battery which is kept in a charged state by conventional alternator charging systems. The battery terminal 51 is selectively coupled, via an automotive ignition switch 52, to the terminal 33. It is significant to note that the nominal battery voltage of 14 volts is less than the reverse zener diode breakdown voltage of 18 volts for the zener diode 45. It should also be noted that the magnitude of the resistor 44 in the protection circuit 41 is selected such that normally the transistor 42 will be on and be close to saturation so as to provide a substantially constant voltage drop between its collector and emitter electrodes. Thus typically the voltage at the collector of the transistor 42 will be 14.0 volts, the voltage at the base of the transistor 42 will be approximately 13.9 volts and the voltage at the emitter of the transistor 42 will be 13.2 volts. For relatively minor variations (8 to 18 volts) of the battery voltage a constant approximately 0.8 volt drop will be present between the collector to emitter electrodes of the transistor 42. However, in the event that an excessively high voltage is present at the terminal 33, wherein this excessively high voltage exceeds 18.7 volts, the zener diode 45 will breakdown and the diode 46 will be forward biased. For any voltages above this threshold voltage, the transistor 42 will insure that only a maximum voltage of 18 volts occurs at the input terminal 12 of the motor control circuit. This thereby protects the motor control circuit from excessively large voltages at the terminal 33. These voltages can occur either due to transient voltages created by the phase windings 14 through 16, excessive charging of the battery 50, a malfunctioning of the battery charging system or the disconnection of one of the battery cables coupling the battery terminals 51 and 52 to the automobile and/or charging system. In any event, the protection circuit 41 will prevent any excessive voltage from occuring at the terminal 12 which terminal is not only a sense input terminal but also the operative voltage input terminal for control circuit 11.

While many other types of protection circuits could be utilized to prevent any overvoltages at the terminal 12, the protection circuit of the present invention has the additional advantage in that for voltages at the terminal 33 which are less than 18.7 volts, the input reference signal at the terminal 12 will directly track the voltage provided at the terminal 33 by the battery 50, and this tracking is independent of the magnitude of the voltage at the terminal 33 or the current required to render the motor control circuit 11 operative. This is because the transistor 42 will provide a substantially constant voltage drop between its collector and emitter terminals for voltages at terminal 33 which are less than 18.7 volts. This means that motor control circuits such as the circuit 11 can be designed without trying to make their operative current requirements identical since different operative currents will not effect the operation of the present motor control system because the signal at the terminal 12 will not be affected by variations in the amount of operative current drawn by the motor control circuit 11. It should be emphasized that it is imperative that the input signal provided at the terminal 12 be substantially directly related to the voltage at the terminal 33 about which the induced signals in the phase windings 14 through 16 vary. This is because it is this relationship which determines when the motor control circuit 11 will sequence the phase drive signals to the motor phase windings. As noted before, if this relationship is not maintained, improper motor control system operation will probably result.

It should be noted that preferably the transistor 42 corresponds to an MPSA06 transistor manufactured by Motorola, Inc. and the resistor 44 corresponds to a 100 ohm 2 watt resistor. Also, preferably the capacitor 43 is a 10 microfarad, 50 volt capacitor and is just utilized to suppress short duration transient voltages which may occur at the terminal 12.

It should be noted that preferrably the motor control circuit 11 comprises an integrated circuit, and that therefore the number of inputs and outputs to the motor control circuit is significant. Thus the present invention, by contemplating that the terminal 12 corresponds not only to the power supply positive operative power input to the motor control circuit but also corresponds to the sensing input with regard to the voltage level at the neutral terminal 33, minimizes the number of outside connections which must be made to the motor control circuit.

While specific embodiments of the present invention have been shown and described, further modifications and improvements will occur to those skilled in the art. All such modifications which retain the basic underly-

I claim:

1. A brushless direct current motor control system with protection circuitry comprising:

motor control means for receiving an input reference signal at an input terminal and also receiving a plurality of phase winding signals induced in associated motor phase windings by a varying magnetic field and for providing, in response to the effective comparison of said reference signal with said induced phase winding signals, cyclic and sequential phase winding motor drive signals as outputs to said associated motor phase windings, said induced phase winding signals varying about a predetermined variable reference signal level provided at a first terminal connected to said motor phase windings; and protection circuit means coupled between said first terminal and said input terminal of said motor control means for receiving said predetermined reference signal level and providing in response thereto said input reference signal, the magnitude of said input reference signal normally tracking the magnitude of said predetermined variable reference signal, said protection circuit means comprising a transistor having first and second current conducting electrodes coupled between said first terminal and said input terminal of said motor control means and a resistor means coupled between one of said first and second electrodes and a control electrode of said transistor, said resistor means coupling operative voltage from said one of said first and second electrodes to said control electrode to maintain said transistor on.

2. A motor control system according to claim 1 wherein said transistor has a collector electrode coupled to said first terminal, an emitter electrode coupled to said input terminal and a base electrode, corresponding to said control electrode, coupled to said collector electrode by said resistor means.

3. A motor control system according to claim 2 wherein said protection circuit means includes a zener diode means having a predetermined reverse breakdown voltage and having cathode and anode electrodes with one of these zener electrodes coupled to the base of said transistor and the other of these zener electrodes coupled to a fixed reference potential, said zener diode means preventing said operative voltage at said base provided by said resistor means exceeding a predetermined voltage regardless of the voltage at said first terminal due to breakdown of said zener diode means.

4. A motor control system according to claim 3 which includes a battery, having terminals and providing a nominal voltage therebetween, selectively coupled by a switch to said first terminal and between the collector of said transistor and said other electrode of said zener diode means, said battery nominal voltage being less than said zener diode reverse breakdown voltage.

5. A motor control system according to claim 4 wherein operative power for said motor control means is provided thereto by the voltage potential provided at said input terminal.

6. A motor control system according to claim 5 wherein said reference potential corresponds to ground potential and wherein said battery nominal voltage is provided with respect to ground potential.

7. A motor control system according to claim 5 wherein the magnitude of said resistor means is selected such that a substantially constant voltage drop is provided between the collector and emitter terminals of said transistor for voltage potentials at said first terminal with respect to said reference potential which are less than said zener diode reverse breakdown voltage.

8. A motor control system according to claim 7 wherein said protection circuit means includes a diode coupled between said other electrode of said zener diode means and said reference potential.

9. A motor control system according to claim 8 wherein said protection circuit means includes a transient suppressing capacitor means connected between the emitter electrode of said transistor and a predetermined reference potential.

10. A motor control system according to claim 7 wherein said phase windings are connected in a Y configuration with said first terminal corresponding to a neutral common terminal of said Y configuration.

11. A motor control system according to claim 10 wherein one of the terminals of said battery is selectively connected to said first terminal with said battery voltage substantially corresponding to said reference signal level.

12. A motor control system according to claim 1 wherein operative power for said motor control means is provided thereto by the voltage potential provided at said input terminal.

13. A motor control system according to claim 1 wherein the magnitude of said resistor means is selected such that a substantially constant voltage drop is provided between said current conducting electrodes of said transistor for voltage potentials at said first terminal which are less than a predetermined voltage potential.

14. A motor control system according to claim 3 wherein the magnitude of said resistor means is selected such that a substantially constant voltage drop is provided between the collector and emitter terminals of said transistor for voltage potentials at said first terminal with respect to said reference potential which are less than said zener diode reverse breakdown voltage.

15. A motor control system according to claim 4 wherein said phase windings are connected in a Y configuration with said first terminal corresponding to a neutral common terminal of said Y configuration.

16. A brushless direct current motor control system with protection circuitry comprising:

motor control means for receiving an input reference signal at an input terminal and also receiving a plurality of phase winding signals induced in associated motor phase windings by a varying magnetic field and for providing, in response to the effective comparison of said reference signal with said induced phase winding signals, cyclic and sequential phase winding motor drive signals as outputs to said associated motor phase windings, said induced phase winding signals varying about a predetermined reference signal level provided at a first terminal connected to said motor phase windings; and protection circuit means coupled between said first terminal and said input terminal of said motor control means for receiving said predetermined reference signal level and providing in response thereto said input reference signal, said protection circuit means comprising a transistor having first and second current conducting electrodes coupled between said first terminal and said input terminal of said motor control means and a resistor coupled between one of said first and second electrodes and a control electrode of said transistor;

wherein said transistor has a collector electrode coupled to said first terminal, an emitter electrode coupled to said input terminal and a base electrode, corresponding to said control electrode, coupled to said collector electrode by said resistor, wherein said protection circuit means includes a zener diode having cathode and anode electrodes with one of these zener electrodes coupled to the base of said transistor and the other of these zener electrodes coupled to a reference potential, wherein the system includes a battery, having terminals and providing a nominal voltage therebetween, selectively coupled by a switch to said first terminal and between the collector of said transistor and said other electrode of said zener diode, said battery nominal voltage being less than said zener diode reverse breakdown voltage, wherein operative power for said motor control means is provided thereto by the voltage potential at said input terminal, wherein the magnitude of said resistor is selected such that a substantially constant voltage drop is provided between the collector and emitter terminals of said transistor for voltage potentials at said first terminal with respect to said reference potential which are less than said zener diode reverse breakdown voltage, and wherein said protection circuit means includes a diode coupled between said other electrode of said zener diode and said reference potential.

17. A motor control system according to claim 16 wherein said protection circuit means includes a transient suppressing capacitor means connected between the emitter electrode of said transistor and a predetermined reference potential.

18. A brushless direct current motor control system with protection circuitry comprising:

motor control means for receiving an input reference signal at an input terminal and also receiving a plurality of phase winding signals induced in associated motor phase windings by a varying magnetic field and for providing, in response to the effective comparison of said reference signal with said induced phase winding signals, cyclic and sequential phase winding motor drive signals as outputs to said associated motor phase windings, said induced phase winding signals varying about a predetermined variable reference signal level provided at a first terminal connected to said motor phase windings; and protection circuit means coupled between said first terminal and said input terminal of said motor control means for receiving said predetermined variable reference signal level and providing in response thereto said input reference signal, said protection circuit means comprising a transistor having first and second current conducting electrodes coupled between said first terminal and said input terminal of said motor control means and a resistor coupled between one of said first and second electrode and a control electrode of said transistor, wherein said transistor has collector and emitter electrodes corresponding to said current conducting electrodes and a base electrode corresponding to said control electrode, and wherein said protection circuit means includes a zener diode having cathode and anode electrodes with one of these zener electrodes coupled to the base of said transistor and the other of these zener electrodes coupled through a diode to a reference potential.

19. A motor control system according to claim 18 which includes a battery, having terminals and providing a nominal voltage therebetween, selectively coupled by a switch to said first terminal and between the collector of said transistor and said other electrode of said zener diode, said battery nominal voltage being less than said zener diode reverse breakdown voltage.

20. A motor control system according to claim 19 wherein said reference potential corresponds to ground potential and wherein said battery nominal voltage is provided with respect to ground potential, and wherein the magnitude of said resistor is selected such that a substantially constant voltage drop is provided between the collector and emitter terminals of said transistor for voltage potentials at said first terminal with respect to said reference potential which are less than said zener diode reverse breakdown voltage.

* * * * *